March 13, 1962  E. C. ROWLEY  3,024,553

MOUNT FOR PHOTOGRAPHS

Filed Oct. 7, 1959

INVENTOR.
ELLIS C. ROWLEY.
BY Louis V. Lucia
ATTORNEY.

United States Patent Office 3,024,553
Patented Mar. 13, 1962

3,024,553
MOUNT FOR PHOTOGRAPHS
Ellis C. Rowley, 98 Sunny Reach Drive,
West Hartford, Conn.
Filed Oct. 7, 1959, Ser. No. 844,889
1 Claim. (Cl. 40—158)

My invention relates to a mount for photographs and more particularly to a cardboard mount such as used for containing, protecting and displaying photographs, pictures, and the like.

Most such mounts presently in common use comprise merely a front and back portion usually made from a single sheet of cardboard folded about a predetermined fold line, the front portion usually having therein an opening through which a photograph mounted on the back portion may be viewed. Much inconvenience is experienced and time consumed in attempting to position and secure a photograph within such a mount. The usual unhappy result of such time consuming effort is a photograph affixed askew within the mount and covered with smudges and marks attesting the use of messy glues or pastes. As a consequence thereof, most valued photograps or snapshots repose within a box or envelope in a little used desk drawer, since the owner would rather sacrifice the visual enjoyment thereof than risk their destruction in an attempt to mount them for display.

A great number of business concerns today realize the many intangible benefits derived from an active public relations program, and therefore, sponsor and encourage visitations of their business facilities by the public at large. A yearly open house and plant tour have become an annual event for many progressive companies. In conjunction with such promotional activity, a number of companies are exploiting the promotional opportunities offered by a new camera which both takes and develops a photograph within a matter of seconds. At some point during the tour of the plant, each visitor's picture is taken and presented to him as a memento of his visit. Usually this fragile and valued remembrance deteriorates into a wrinkled and cracked piece of paper by the time it is removed from one's pocket, having completely lost its original identity and value.

Church fairs, outings and other money-making functions frequently promote the sale of similar "one minute" photos to those in attendance and are likewise confronted with the problem of providing a suitable, yet economical, merchandising package or folder by means of which the sale of the photos may be increased.

It is therefore an object of my invention to provide a mount for photographs or snapshots having means thereon for securing a photograph thereto whereby the photo will be held rigidly in position while being protected and framed for display.

Another object of my invention is to provide a mount for photographs having means thereon for rigidly securing a photograph thereto as well as securing the framing portion of said mount rigidly against said photograph.

A further object of my invention is to provide a mount for photographs having indices thereon for convenient and rapid positioning of a photograph within the mount.

Another object of my invention is to provide a mount for photographs which is very simple to make, in which all parts of the mount are provided in assembled relation and which is always ready for immediate use.

A still further object of my invention is to provide a mount for photographs which incorporates novel and inexpensive photo securing means yet can be produced and sold inexpensively.

Further objects and advantages of the present invention will be more clearly understood from the following description and accompanying drawings in which.

Figure 1:
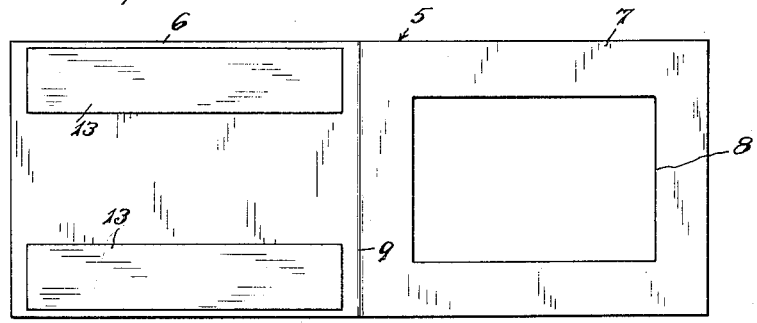
FIG. 1 is an elevational front view showing my improved photo mount in open position.

As shown in the drawings, my improved mount 5 comprises a generally rectangular back panel 6 and a similarly shaped cover or framing panel 7 having a display opening 8 therein. The said mount 5 is preferably constructed of a relatively light, durable, and flexible cardboard material or the equivalent, and is scored or creased to provide a fold line 9 separating the panels 6 and 7, and about which the panel 7 is folded against the panel 6 of said mount.

Indices 10—10 are provided on the back panel 6, to positively locate a photograph rapidly and conveniently by merely placing the edges of said photo adjacent thereto. Said indices 10—10 may take many forms. As shown for example, they consist of four right angles—one at each corner of the mounting area to be delineated. The said right angles have inwardly extending legs, each parallel with one or more edges of said panel 6. The area thus delineated by the indices 10—10 is always disposed to register with the centrally located opening 8 in the framing panel 7 when said panel is folded against panel 6. The area delineated by the indices is substantially similar in size and shape to that of the photograph; however, the opening 8 is slightly smaller than the photo in length and width, whereby to provide a shield for the edge portions of the photo while framing and displaying the important features thereof.

Figure 2:
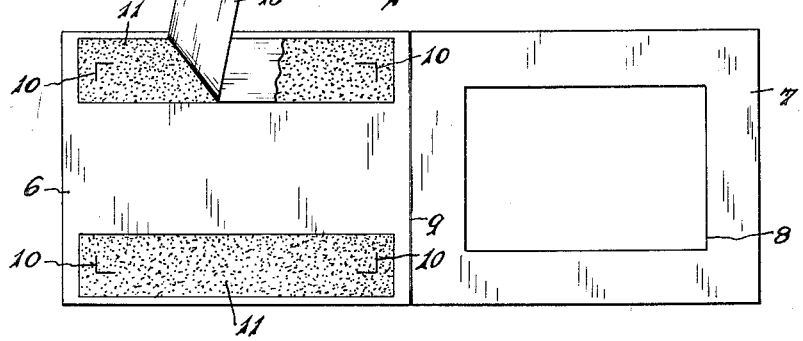
FIG. 2 is a similar view showing the adhesive on the back panel being exposed.

In order to secure the photograph within the mount, the back panel 6 is provided with spaced parallel strips 11—11 of a suitable, transparent, pressure-sensitive adhesive, preferably of the type commonly used on cellophane tape or the like. Such pressure-sensitive adhesives provide a very high adhesive factor per unit of area and will readily adhere to the back or unsensitized surface of an ordinary photograph with only a slight amount of pressure. Said parallel strips are applied over the indices 10—10 which are visible therethrough for positioning the photo thereon. While FIG. 2 shows the strips parallel to the longitudinal axis of the mount, equally satisfactory results may be obtained if the strips are parallel to the transverse axis thereof.

Figure 3:
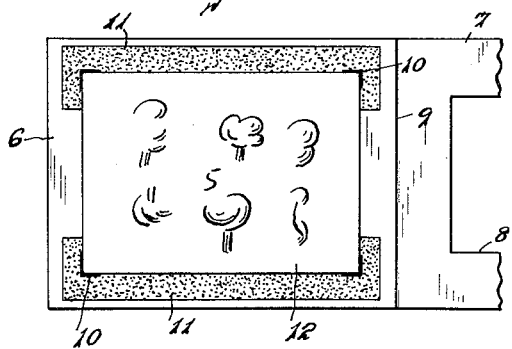
FIG. 3 is a similar view showing a photograph located upon the adhesive for mounting.
Figure 4:
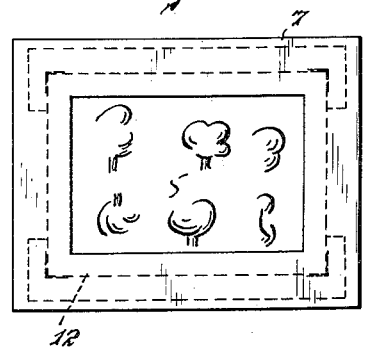
FIG. 4 is an elevational front view showing a photograph completely mounted in my improved mount.

Said strips of adhesive are of such length and width to extend beyond the area delineated by the indices as illustrated in FIG. 3 in order to secure the framing panel 7 thereto when said panel is folded about the fold line 9 and disposed against the back panel. The said strips will thereby adhere both the photograph 12 and the framing panel securely and accurately against the back panel 6.

As previously pointed out, a transparent adhesive is preferably used since the indices might then be printed directly on the back panel prior to applying the adhesive, and yet be visible through the adhesive film applied thereafter.

It is to be noted that the areas coated with the pressure-sensitive adhesive are normally covered and protected by readily removable strips of specially treated paper 13 or the like. The protective paper 13 may be readily peeled back as shown in FIG. 2 exposing the adhesive strips 11—11 for picture mounting readiness.

While I have shown the preferred embodiment of my invention, it is understood that various changes may be

I claim:

A mount for a photograph made of cardboard-like material including a back panel and a framing panel foldable thereupon, said panels each being of a larger size than said photograph and said framing panel having a centrally located opening therein of a shape similar to and of a size smaller than the photograph to be framed thereby, indicia printed on said back panel for delineating an area of substantially the same size as said photograph whereby said photograph may be positioned substantially centrally with respect to said opening, transparent pressure-sensitive adhesive on said back panel overlaying said indicia and at least a portion of said area and through which said indicia may be visible, said adhesive extending outwardly of said indicia whereby said photograph may be secured to said back panel and said framing panel secured to said back panel when folded thereupon.

References Cited in the file of this patent

UNITED STATES PATENTS

| | | | |
|---|---|---|---|
| 595,467 | Bruns | Dec. 14, | 1897 |
| 816,870 | Markoff | Apr. 3, | 1906 |
| 1,261,133 | Kidd | Apr. 2, | 1918 |
| 1,520,041 | Walker | Dec. 23, | 1924 |
| 2,271,946 | Miller | Feb. 3, | 1942 |
| 2,283,026 | Yates | May 12, | 1942 |